United States Patent [19]

Rosen

[11] Patent Number: 4,813,534

[45] Date of Patent: Mar. 21, 1989

[54] DISPLAY PACKAGE

[76] Inventor: Howard Rosen, c/o Chicago One Stop, Inc., 401 W. Superior St., Chicago, Ill. 60610

[21] Appl. No.: 67,318

[22] Filed: Jun. 26, 1987

[51] Int. Cl.$^4$ .................. B65D 85/67; B65D 33/00
[52] U.S. Cl. ............................ 206/459; 40/359; 206/387
[58] Field of Search .............. 206/45.33, 307, 312, 206/313, 387, 424, 425, 444, 459; 229/71; 383/40; 40/359

[56] References Cited

U.S. PATENT DOCUMENTS

| | | | |
|---|---|---|---|
| 1,132,972 | 3/1915 | Ralph | 206/312 |
| 1,360,836 | 11/1920 | Wasisco | 206/312 |
| 1,746,608 | 2/1930 | Ridge | 40/359 |
| 1,912,900 | 6/1933 | Karfiol | 229/71 X |
| 3,459,361 | 8/1969 | Matton | 206/312 X |
| 3,500,995 | 3/1970 | Forman | 383/40 x |
| 3,856,063 | 12/1974 | Dengel | 206/444 X |
| 4,477,013 | 10/1984 | Herrin | 229/71 X |
| 4,704,042 | 11/1987 | Eisen et al. | 206/312 X |

FOREIGN PATENT DOCUMENTS

| | | | |
|---|---|---|---|
| 193345 | 2/1957 | Austria | 40/359 |
| 1136663 | 12/1968 | United Kingdom | 206/313 |

Primary Examiner—Stephen Marcus

[57] ABSTRACT

A display package for holding a folded box for audio-visual material having indicia describing the box contents which consists of a transparent envelope, the envelope comprising sheets of plastic material secured together on their edges, one edge being open to permit the folded box to be inserted into and withdrawn from the envelope, one sheet being rigid for holding the envelope upstanding, there being a stop seam at one end of the envelope to hold the folded box positioned away from the envelope edge, and a pocket secured to the envelope on its end opposite the stop seam for holding information related to the category of the audio-visual material. The invention also relates to an indexing system for audio-visual material where a plurality of like such display packages are arranged one behind another in a bin, packed loosely to allow one package to be flipped away from another package for selective browsing through the packages, and to a method for arranging such a system which consists of the steps of removing the materials from their boxes, folding the boxes to a flattened condition, inserting each box into such a display package and arranging the packages upright in a bin for browsing therethrough by a consumer.

6 Claims, 1 Drawing Sheet

DISPLAY PACKAGE

BACKGROUND AND SUMMARY OF THE INVENTION

This invention relates to display packages for video casettes and compact discs, useful in indexing and arranging titles and descriptive information available for review and selection by customers in the environment of a video rental and sales store. The invention also relates to a method for efficient organization of displays in such stores.

Video casettes and compact discs are normally packaged by the manufacturer in oversized boxes, and these boxes have become of substantial value to retail rental and sales storekeepers because the packages contain descriptive information concerning the contents of the casette or disc, and consumers find these packages essential in making a selection of a video or disc for rental or purchase. These packages are usually oversized to make it difficult for the potential shoplifter to remove the product from the store without being detected. However, the condition of the package has also become important, because the wholesale distributor usually will not accept return of the product without the package clean and in tact; it is also believed that the casette or disc cannot be sold or rented at the best possible price if the package is damaged, missing or soiled. For these reasons, most video store operators are very protective of the manufacturer's packaging and are concerned with maintaining such packages clean and unsoiled, although the business requires that the packages be available to the public for use in selecting a tape or disc for rental or purchase. It is that dilemma of the storekeepers who want to make these packages available for use by the consumer but retain them in good condition, that this invention speaks and seeks to solve.

Usually, in a typical video store such packages prepared and supplied by the casette or disc manufacturer (as the outside jacket of his product) are arranged on a shelf or wall display in the store. Where the retailer maintains an inventory of several thousand prerecorded casette and compact discs, the space problem for the store is magnified by the display requirements. Such a store usually must have several thousand square feet to meet the display space requirements, even though the inventory requirement for the store is very small, because the casettes and discs can be handled in a fraction of the total store space. These display problems are even more critical in view of variations in the manufacturer's package size and design utilized by different makers. There is considerable competition for display space, and each manufacturer tries to make its display package more enticing to the consumer, and that motive makes it even more difficult for the storekeeper to present an organized and convenient display arrangement. Further, some casettes are available for Beta video casette recorders and others use a VHS system, and each maker and system present quirks in the sizing and styling of the display boxes, emphasizing the need for a most versatile display system.

These problems in maintaining and using conventional display packages for video casettes and compact discs may be substantially overcome by the display package and method embodying the present invention. For example, a wall display shelving system popular in the video store business utilizing conventional display packages and methods requires about 260 square feet, or 32 lineal feet, eight feet tall, to handle about 1,000 video casette and/or compact disc titles, and even so, some display packages are too high for examination by short people, women and children, and other display packages are arranged on floor level shelves, making it difficult for some people to reach them. Using the novel display system embodying the present invention, only a small fraction of the store space is needed for display of the same thousand titles, usually about only six square feet, all at counter height convenient for most people to use.

Moreover, applicant's novel display system opens up to the entrepeneur possibilities not available with prior art systems. More titles can be handled in the same space. Space rentals on a per title offered basis are substantially less. Better and more convenient store locations are possible using less square footage. Other opportunities to handle related merchandise become available using applicant's system, for example, businesses such as convenience and drug stores, supermarkets and the like with applicant's system have the opportunity of marketing video casettes and compact discs, without causing special space problems normally associated with the use of conventional displays.

Applicant's display package consists of a special clear plastic envelope of sufficient dimension to contain most known video casette and compact disc display boxes. This novel envelope is constructed so that it is adequately rigid to be arranged upstanding in a display bin, but it is also suitably soft to permit easy entrance in and withdrawal from the envelope of the manufacturer's display package box and other indicia. The envelope also has seals and stops to permit the manufacturer's package box to be somewhat lifted so that the envelope contents can be easily read as a consumer flips through a number of similar envelopes arranged in a series one behind the other in a bin. Preferably, each envelope has suitable pockets for holding a header having indicia classifying the program contents, as well as other pockets for inventory and similar information. It is desirable for the envelopes and a suitable bin for holding them be dimensioned so that the bin can also suitably house the envelopes during shipment and then be used by the retailer as a container for housing indexed envelopes for use by customers browsing for their video casette or compact disc selections.

OBJECTS AND ADVANTAGES OF THE INVENTION

It is the object of the present invention to provide a novel display package of the character recited for video casettes and compact discs.

Another object is to provide a display package which consists of an envelope suitably transparent for viewing of a folded box inserted therein and suitably flexible for easy insertion of the box, but suitably rigid to permit like envelopes arranged one behind the other to be indexed upstanding and browsed through by a consumer.

Another object is to provide a series of envelopes containing folded video casette and compact disc display boxes arranged in bins for indexed browsing and selection by a consumer.

Another object is to provide a novel display envelope of transparent material having seals and stops for displaying a folded box in a selected position.

Another object is to provide a novel transparent display envelope having suitable pockets for receiving indicia in a header along one edge of such an envelope and other pockets for receiving indicia along an opposed edge of such an envelope Another object is to provide a carton having arranged therein a series of transparent envelopes stacked one behind another, wherein the carton is suitable for use as a bin for indexed arrangement of such envelopes when filled with folded boxes.

Another object is to provide for a method for efficient organization of video casette and compact disc titles in a video rental and sales store.

A further object is to provide a display package for video casette and compact disc containers which is inexpensive and efficient to arrange and use without affecting future use of such containers.

These and other objects and advantages of the invention will become more apparent as this description proceeds, taken in conjunction with the accompanying drawings.

DESCRIPTION OF PREFERRED EMBODIMENTS

Figure 1:
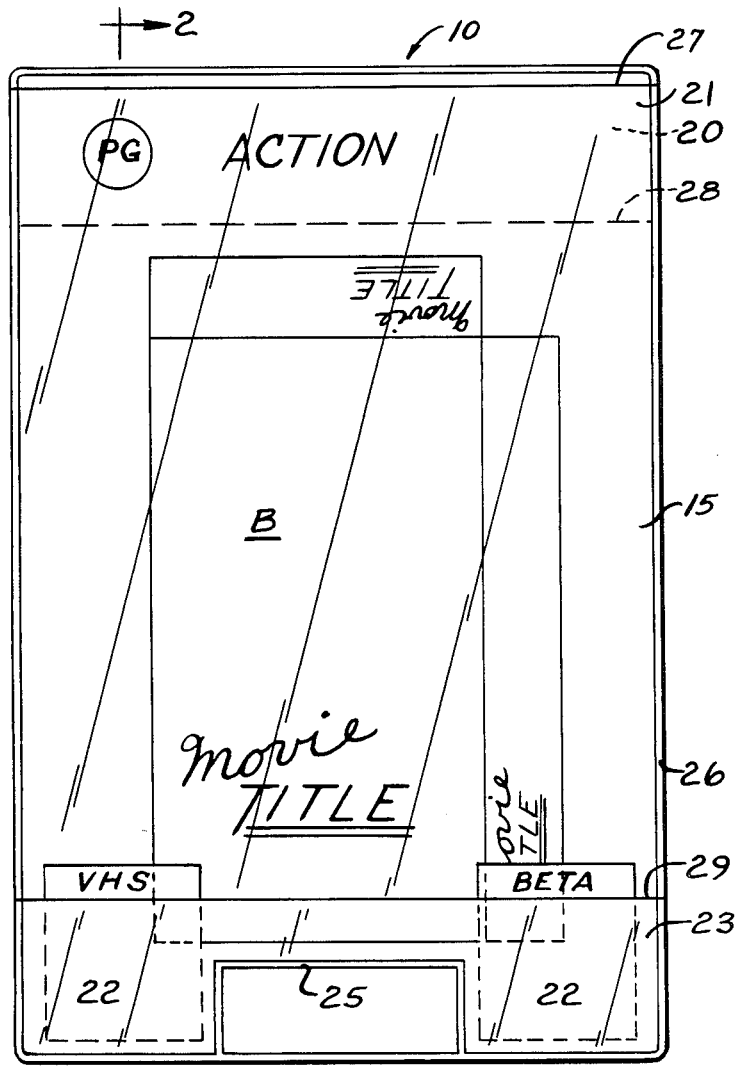
FIG. 1 is a front elevational view of a display package embodying the present invention.
Figures 2, 3, 4:
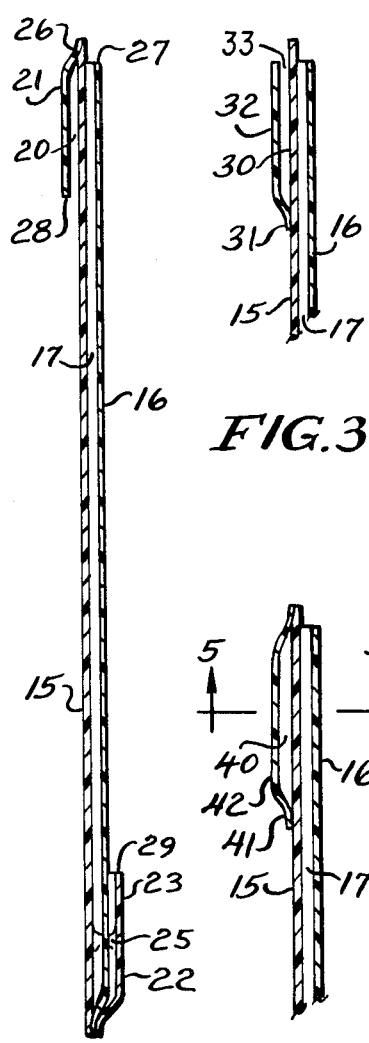
FIG. 2 is a section view of the display package taken on line 2—2 of FIG. 1.
FIG. 3 is of a modified header arrangement similar to FIG. 2, except with portions broken away.
FIG. 4 is another cross section view of another modified header arrangement similar to FIG. 2, except with portions broken away.
Figure 7:
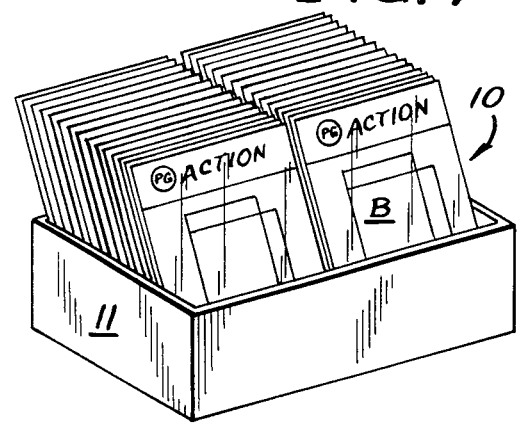
FIG. 7 is a typical perspective view of the envelopes arranged in a bin embodying the present invention.

With reference particularly to FIGS. 1, 2 and 7, an envelope 10 fabricated from transparent material, preferably made from sheets of polyethylene or poly vinyl chloride, is adapted to receive a folded box B of the kind used to house a video casette or compact disc. Such boxes are usually made from paperboard or similar material and are foldable to a flat condition when the video casette or compact disc is removed. The outside surfaces of the box usually describes the contents including the title of the work, its cast and credits, a synopsis of the story or other work contained on the casette or disc, and other information which may be helpful in interesting the consumer in the work.

As shown in FIG. 7, a series of like envelopes 10 are arranged one behind another and side by side in a bin 11. This bin 11 may comprise a corrugated box having a conventional cover (not shown) which may be used by the envelope manufacturer to ship a supply of envelopes to the video store and then used by the retailer to display envelopes containing the folded boxes B, which are usually arranged so that the envelopes may be indexed, for example by category or alphabetically or otherwise, and flipped for browsing by the consumer when selecting a desired video casette or compact disc title. Once the desired title is selected, the consumer may inform an attendant of the selection, and the attendant may select the casette or disc requested by the consumer from a secured inventory held by the storekeeper away from access by the consumer.

Preferably, the envelope 10 is fabricated from sheets of predetermined varying rigidity. One of the larger sheets 15 of the envelope is preferably of relatively stiff plastic, and its adjacent sheet 16 is relatively flexible, so that the pocket 17 formed by the adjacent sheets 15 and 16 for containing the folded box B is flexible, permitting easy entry into the pocket while providing overall rigidity of the envelope to permit it to be arranged in selected indexed position upstanding in the bin 11. The envelope 10 may also have a header pocket 20, formed by a sheet 21 overlaying the larger sheet 15. This header pocket 20 may be used to display indicia such as the category of the casette or disc.

Lower pockets 22 may also be formed by a lower sheet 23 arranged across the lower portion of the adjacent sheets 15 and 16. Preferably, a stop 25 is provided across the sheets 15, 16 and 23 which acts to prevent the folded box B in pocket 17 from bottoming out in the pocket 17, and instead the folded box B is elevated in the pocket, bottoming out instead on the stop 25, so that the folded box B is essentially presented in the center of the pocket 17, thus facilitating flipping of the envelopes and presenting the boxes B in a more uniform position, despite limited differences in sizes.

Preferably, the entire periphery of the adjacent sheets 15 and 16, except the upper edge of the sheet 16, the periphery of the sheet 21, except its lower edge, and the periphery of the sheet 23, except its upper edge, are sealed by means of a heat-sealed seam 26, and this seam 26 defines the pockets. The open entry to the pockets 17, 20, and 22 are defined by the unsealed open edges of the sheets 16, 21 and 23, at entries 27, 28 and 29, respectively.

Figure 5:
FIG. 5 is a cross-sectional view of the modified header arrangement shown in FIG. 4, taken on line 5—5 of FIG. 4.
Figure 6:
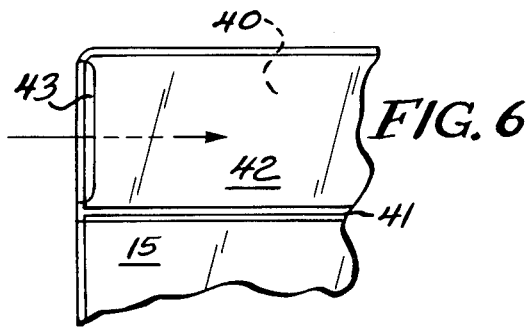
FIG. 6 is a fragmentary front elevational view of the header arrangement shown in FIGS. 4 and 5.

In the embodiment shown in FIG. 3, the header pocket 30 has a heat seam 31 at its bottom edge of the small sheet 32, so that the pocket 30 has its entry at the top edge 33 of the pocket, which is formed by welding or other closure between the sheets 15 and 32. In the embodiment shown in FIGS. 4, 5, and 6, the header pocket 40 has a header sheet 42, which with large sheet 15 forms the pocket, and the heat weld 41 joins the sheets 15 and 42 together, except at one side edge 43, which is left open for insertion of the header card into the pocket 40. In the FIG. 3 and FIGS. 4–6 embodiments, there is less change for the header card to slip out of the respective pockets 30 and 40, as compared to pocket 20 in the FIGS. 1–2 embodiment, because the modified pockets 30 and 40 have an opening other than at tee bottom of the pocket. However, if the header card intended for insertion into the pocket 20 is cut with great care to a size about the size of that pocket, there is little danger of the header card falling from the pocket, and the additional cost of seaming at heat seam 31 and heat weld 41 in the modified embodiment is not always justified.

Preferably, the larger or base sheet 15 is fabricated from about 0.020 gauge clear rigid poly vinyl chloride plastic and the other sheets are fabricated from about 0.006 gauge clear flexible poly vinyl chloride plastic.

While the embodiments of the invention have been described in considerable detail, it is not desired that the invention should be limited to the exact structure described, as the structure can be modified or changed without departing from scope of spirit of the invention.

I claim:

1. A display package for holding a folded box having indicia thereon, said display package comprising: an envelope, at least a portion of which is transparent to display said folded box when placed therein, said envelope comprising a rigid sheet and a flexible sheet coextensive with said rigid sheet, said sheets being secured together and sealed at their edges except at one edge where said envelope is open to permit said folded box to be admitted into and withdrawn from said envelope; a stop seam through said sheets and welding said sheets together, said stop seam being arranged at an end of said envelope opposed to said open edge, said stop seam being adapted to hold said folded box positioned away from said co-extensive sealed sheet edges remote from said open edge; and a pocket viewable from the exterior of said display package, said pocket secured to one of said sheets and positioned at an end of said envelope adjacent said open edge, said pocket having an edge secured to said envelope corresponding and common to at least one of said sealed sheet edges, said pocket being adapted to receive media other than said folded box.

2. The display package recited in claim 1, wherein a lower pocket is secured to one of said sheets on an end of said envelope adjacent said stop seam between said stop seam and said sealed coextensive sheet edges.

3. The display package recited in claim 1, wherein said pocket is formed by said rigid sheet and a smaller sheet secured to said rigid sheet.

4. The display package recited in claim 3, wherein said rigid sheet is arranged between said flexible sheet and said smaller sheet.

5. A display package for holding a folded box having indicia thereon, said display package comprising: an envelope, at least a portion of which is transparent to display said folded box when placed therein, said envelope comprising a rigid sheet and a flexible sheet coextensive with said rigid sheet, said sheets being secured together to form a compartment for containing said folded box, said envelope being open at one end to permit said folded box to be admitted into and withdrawn from said envelope; a stop seam through said sheets and welding said sheets together, said stop seam being arranged near an end of said envelope opposed to said open end, said stop seam being adapted to hold said indicia positioned spaced away from said end opposed to said open end; and a lower pocket for containing media other than said folded box viewable from the exterior of said display package, said lower pocket being formed by another flexible sheet secured to said rigid sheet and positioned at said end of said envelope opposed to said open end, said lower pocket and said envelope sheets having at least two corresponding and common edges.

6. A display package for holding a folded box having indicia therein, said display package comprising: an envelope, at least a portion of which is transparent to display said folded box when placed therein, said envelope comprising coextensive sheets secured together to form a compartment for containing said folded box; said envelope being open at one end to permit said folded box to be admitted into and withdrawn from said envelope; a stop seam through said sheets and welding said sheets together, said stop seam being arranged near an end of said envelope opposed to said open end, said stop seam being adapted to hold said folded box positioned spaced away from said near end; a first pocket viewable from the exterior of said display package secured to one of said sheets and positioned at an end of said envelope adjacent said open edge; and a lower pocket also viewable from the exterior of said display package, said lower pocket being formed by another sheet secured to one of said envelope sheets on a face of said envelope opposed to said first pocket and positioned at an end of said envelope remote from said open end, said first pocket and said lower pocket each having at least two edges corresponding and common to the edges of said coextensive envelope sheets.

* * * * *